United States Patent

Kramer et al.

[15] 3,705,780

[45] Dec. 12, 1972

[54] APPARATUS FOR MAKING FLEXIBLE TUBING WITH ANNULAR CORRUGATIONS

[72] Inventors: Vance M. Kramer, 402 E. Baindary Rd., Perrysburg, Ohio 43551; Lawrence W. Carlton, 354 Seabee Ave., Naples, Fla. 33940

[22] Filed: Oct. 9, 1970

[21] Appl. No.: 79,394

[52] U.S. Cl. ............... 425/389, 264/94, 425/391, 425/392
[51] Int. Cl. ............................................. B29c 17/07
[58] Field of Search ....... 18/19 A, 19 TC, 19 F, 14 R, 18/45 R; 264/94

[56] References Cited

UNITED STATES PATENTS

| | | | |
|---|---|---|---|
| 3,371,381 | 3/1968 | Louth | 18/19 TC |
| 2,446,281 | 8/1948 | Harding | 18/19 TC X |
| 2,616,129 | 11/1952 | Burton et al. | 18/19 TC X |
| 3,076,228 | 2/1963 | Johnson | 18/19 TC |

Primary Examiner—Robert L. Spicer, Jr.
Attorney—Bosworth, Sessions, Herrstrom & Cain

[57] ABSTRACT

Apparatus for making flexible tubing with annular corrugations and uniform wall thickness. The apparatus includes a tubular cylindrical mandrel adapted to receive a sleeve of extruded rubber, and an axially extensible external form adapted to be received over the mandrel and sleeve. The form includes a plurality of axially spaced disk-like elements, each having a circular opening coaxial with the respective circular openings of the other elements, and a plurality of resilient extensible helical springs spaced about the axis of the openings. Each spring is connected to each disk-like element to support the elements in uniformly spaced parallel relation to one another to accommodate generally uniform increase in the axial spacing between said elements when the springs are axially extended. The mandrel has radial ports so that the sleeve may be expanded by internal pressure to make a preliminary impression in the uncured rubber caused by the edges of the circular openings of the disk-like elements.

5 Claims, 9 Drawing Figures

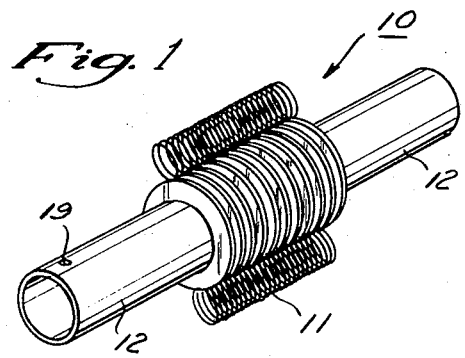
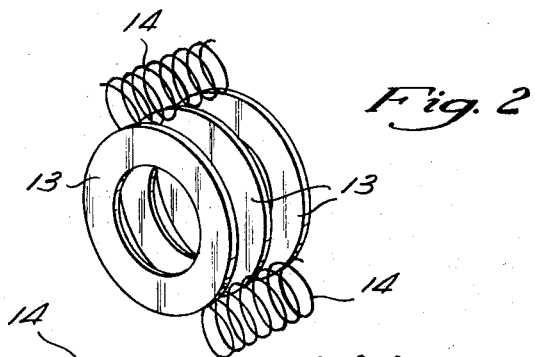
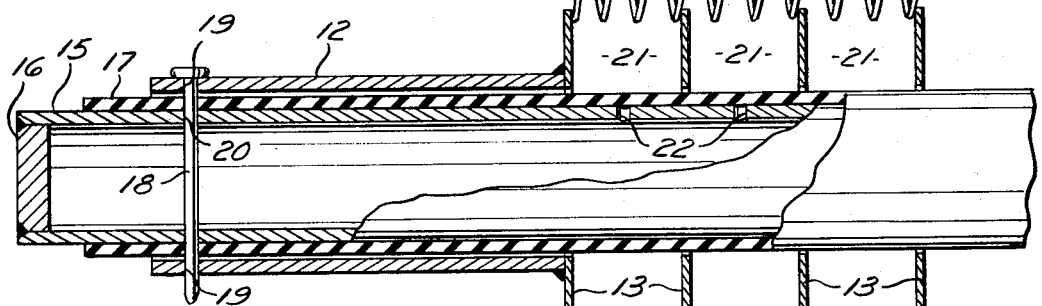
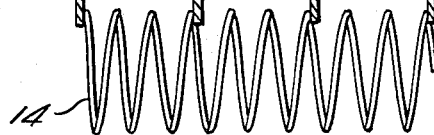
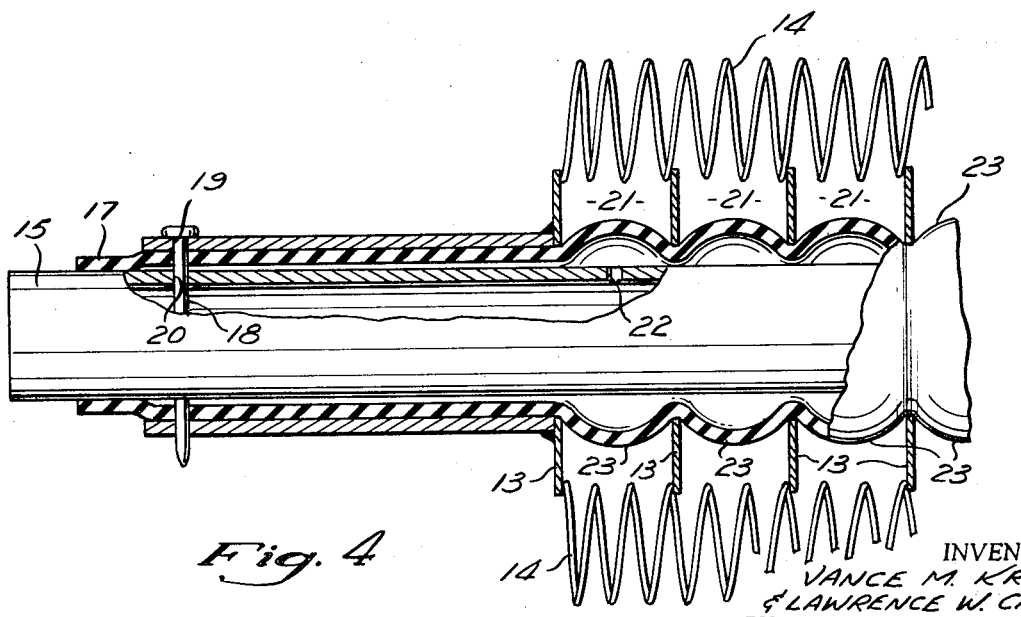

INVENTORS
VANCE M. KRAMER,
& LAWRENCE W. CARLTON
BY
BOSWORTH, SESSIONS,
HERRSTROM & CAIN

ATTORNEYS

APPARATUS FOR MAKING FLEXIBLE TUBING WITH ANNULAR CORRUGATIONS

CROSS-REFERENCE TO RELATED APPLICATION

This application relates to and incorporates by reference herein the subject matter of copending U.S. patent application Ser. No. 46,865, filed June 17, 1970.

BACKGROUND OF THE INVENTION

This invention relates to the manufacture of flexible rubber tubing with annular corrugations and a uniform wall thickness. More particularly the invention relates to an apparatus for the manufacture of such tubing using certain improvements upon the method and apparatus disclosed in U.S. Pat. Nos. 3,168,604 and 3,304,581, and especially to an apparatus for making flexible rubber tubing using an improvement on the "axially extensible helix" method of U. S. Pat. No. 3,168,604 so as to produce tubing with annular rather than helical corrugations. The apparatus is particularly adapted to the practice of the method of U.S. patent application Ser. No. 46,865 referred to above.

As disclosed in U.S. Pat. Nos. 3,168,604 and 3,304,581, helically corrugated tubing may be made by sliding an extruded sleeve of uncured rubber over a cylindrical forming mandrel, telescoping a helical forming spring over the sleeve, stretching the spring axially so that helical spaces are defined between adjacent convolutions of the spring, and then inflating the sleeve by fluid pressure in the mandrel to expand the wall of the sleeve into helical spaces. With the sleeve thus inflated the spring is collapsed axially with the walls of the sleeve still within the constricting spaces so that the sleeve is axially shortened as the side wall thereof is squeezed in accordion fashion between the helices of the spring. This results in the impressing of a helical crease in the uncured rubber.

The creased sleeve is then removed and placed on a curing mandrel where it is again shortened axially into a helically corrugated form with adjacent convolutions collapsed closely beside one another. The rubber thus formed is then cured in a curing oven. The resulting product is quite flexible and is axially stretchable to two or three times its normal collapsed length. It also has a uniform wall thickness.

The helically corrugated tube produced has particular application as tubing for use in connection with vacuum cleaning equipment, etc.

In certain commercial applications for such tubing, however, such as where air is passed through the tubing at high velocity (as with vacuum cleaner hose), a screaming sound is produced due to the helical corrugations. Also in the case of vacuum cleaner hose, when the hose is stretched out while using an implement such as a vacuum cleaner head at the free end, a twisting or turning of the tool occurs. Where the helically corrugated hose is clamped to associated equipment with clamps designed for use with annularly corrugated hose, this twisting may cause the hole to pull loose from the clamp.

The method and apparatus of the aforementioned U.S. patent application Ser. No. 46,865 provide an improvement upon the axially extensible helix method and apparatus so as to accomplish the manufacture of annularly corrugated rubber tubing while still retaining the advantages of the axially extensible helix method and apparatus. The present invention provides another and in some respect improved apparatus for practicing the invention of U.S. patent application Ser. No. 46,865 and which is preferred for certain manufacturing situations.

SUMMARY OF THE INVENTION

A general object of the invention is to provide an improved apparatus of the type disclosed and claimed in the aforesaid U.S. patent application for making flexible rubber tubing with annular corrugations while achieving the advantages of the axially extensible helix method.

This and other objects are accomplished by means of an apparatus including a cylindrical mandrel adapted to receive a sleeve of extruded rubber and an axially extensible external form adapted to be received over the mandrel and sleeve. The form includes a plurality of axially spaced disk-like elements each having a circular opening coaxial with the respective circular openings of the other elements, and a plurality of resilient, axially extensible helical springs spaced about the axis of said openings, each spring being connected to each element. Thus the springs support the disk-like elements in uniformly spaced parallel relation to one another and accommodate generally uniform increase in the axial spacing between the elements when the springs are axially extended. When the external form is in its axially elongated condition, the sleeve may be expanded into the annular spaces between adjacent discs by internal fluid pressure to cause preliminary annular impressions in the uncured rubber.

BRIEF DESCRIPTION OF THE DRAWINGS

FIG. 1 is a perspective view showing an external form embodying the invention for use with associated equipment in making flexible rubber tubing with annular corrugations;

FIG. 2 is a fragmentary perspective view on an enlarged scale showing the disc-like elements and helical springs of the form of FIG. 1;

FIG. 3 is a side elevation of the apparatus of the present invention with an uncured rubber sleeve secured between the external form and the mandrel, with parts broken away and shown in section for the purpose of illustration;

FIG. 4 is a side elevation similar to FIG. 3 but illustrating a later sequential step in the operation of the apparatus of the invention;

DESCRIPTION OF THE PREFERRED EMBODIMENT

Figure 5:
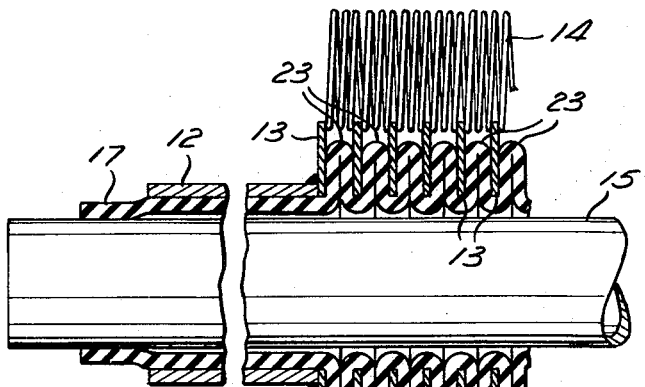
FIG. 5 is a side elevation similar to FIGS. 3 and 4 and illustrating a still further sequential step in the operation of the apparatus of the invention.

Referring more particularly to the drawings, FIGS. 1 and 2 show an external forming member 10 designed for use in the forming of an extruded sleeve of uncured rubber into a tubular length having the intermediate portions thereof formed with annular corrugations. The forming member 10 has an axially expansible portion 11 and two tubular end portions 12.

Referring to FIG. 2 the expansible portion 11 comprises a plurality of annular disk-like elements 13 connected to and supported at their outer edge portions by two helical springs 14. In this instance the connecting is accomplished by welding every third convolution of the helical springs 14 to the outer marginal edge portions of the disk-like elements 13 preferably at circumferential locations diametrically opposite relative to the axis of the form 10.

The springs 14 are formed of resilient metal such as steel wire or rod wound into helical convolutions having a naturally collapsed condition as indicated in FIG. 1. The springs may be axially extended, however, to several times their collapsed length as indicated in FIG. 2. When the expansible portion 10 is axially stretched, the elongation or stretching of the springs 14 produces a uniform increase in the spacing between the disk-like elements 13. The elements 13 remain in parallel planes perpendicular to the axis of the form 10 due to the manner of attachment to the helical springs 14.

FIGS. 3 through 8 illustrate sequentially the use of the forming member 10 in the manufacture of flexible rubber tubing with annular corrugations. Referring to FIG. 3, the forming member 10 is used in cooperation with a forming mandrel 15 also of tubular cylindrical form and which is closed at its outer or left hand end as viewed in FIG. 2 by a plug 16 that is welded in position. In use, an extruded sleeve 17 of uncured rubber is slid over the mandrel 15 in the initial part of the operation. The forming member 10 is then telescoped over the sleeve 17 and mandrel 15 after which the ends 12 of the forming member 10 are pulled apart to stretch the springs 14.

The forming member 10 is held in this axially elongated position (FIG. 3) by means of pins 18 at its opposite ends. The pins 18 extend through radial holes 19 in the wall of the member 10, through the sleeve 17, which is easily punctured, and then through radial holes 20 in the forming mandrel 13. As illustrated in FIG. 3 the extension of stretching of the springs 14 results in a uniform increase in the axial spacing between the disk-like elements 13 and thus enlarged annular spaces 21 are defined between adjacent elements 13.

FIG. 4 illustrates the next step in the operation of the apparatus and the practice of the method, wherein fluid under pressure, such as air, is introduced into the mandrel 15 at the end thereof opposite the end with the plug 16, and flows through radial holes 22 to the space between the sleeve 17 and the outer surface of the mandrel 15. The fluid pressure inflates the sleeve 17 and helical bulges 23 are formed in the spaces 21.

With the sleeve 17 in this condition, the forming member 10 is axially compressed as illustrated in FIG. 5 so that the helical bulges 23 are squeezed between adjacent elements 13 resulting in annular physical impressions in the uncured rubber sleeve 15. These impressions as indicated in FIG. 6 take the form of annular ridges 24 at the peaks of the bulges and annular creases 25 where the inner edges of the elements 13 have engaged the inflated rubber.

Figure 6:
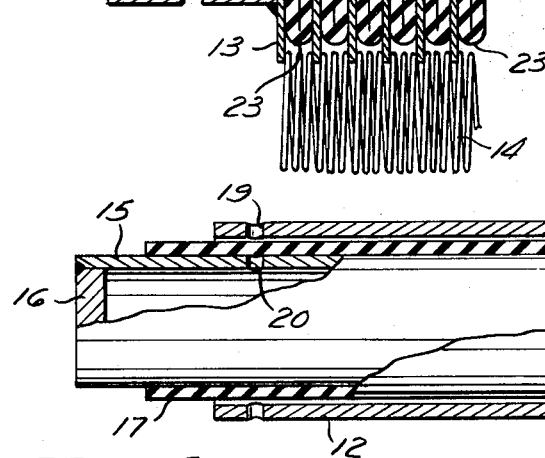
FIG. 6 is a side elevation similar to FIGS. 3, 4 and 5 showing still another sequential step in the operation of the apparatus of the invention.
Figure 7:
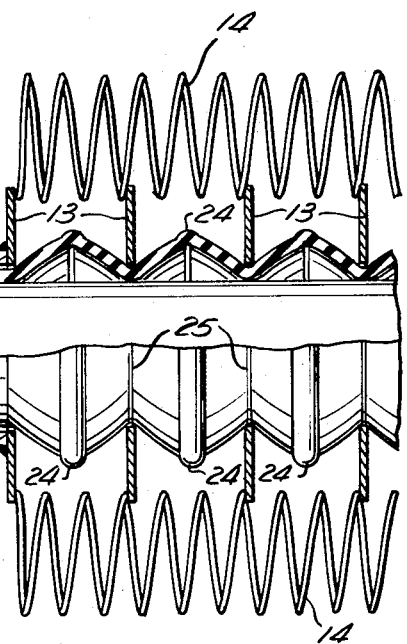
FIG. 7 is a side elevation on a somewhat smaller scale showing a sleeve of uncured rubber that has been impressed with annular creases by the apparatus of the invention, the sleeve being mounted on a curing mandrel and axially compressed for curing in an annularly corrugated state.

After this step is accomplished the forming member 10 is again stretched out as is the sleeve 17 (FIG. 6). The forming member 10 is removed from the sleeve by pulling at one end. This causes the springs 14 to stretch and the sleeve 17 to further extend. The extension of the sleeve 17 is sufficient to reduce the diameter of the bulges 23 between the elements 13 and permit the forming member 10 to be removed from the sleeve 17 and mandrel 15.

The impressed sleeve 17 is then removed from the forming mandrel 15 and placed on a curing mandrel 26 (FIG. 7) where the length of the portion of the sleeve formed with the annular crests 24 and annular creases 25 is reduced to produce annular corrugations that may be closely spaced as shown or of wider spacing as desired.

Figure 8:
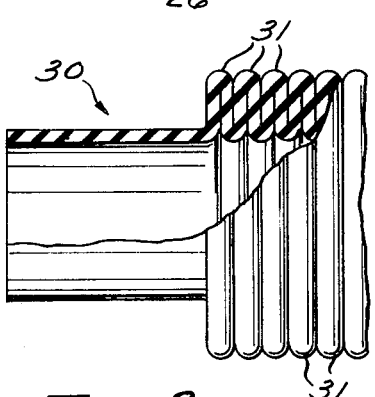
FIG. 8 is a fragmentary elevational view on an enlarged scale showing a length of annularly corrugated rubber tubing manufactured with the apparatus of the invention.
Figure 9:
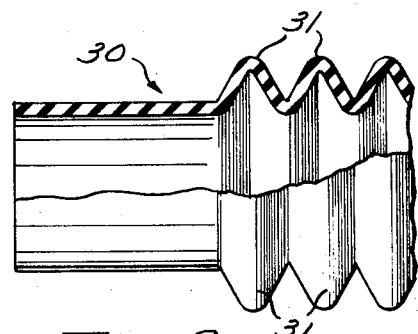
FIG. 9 is a fragmentary elevational view similar to FIG. 8 showing the length of tubing of FIG. 8 stretched axially to about twice its length when in its relaxed condition.

The resulting product is best illustrated in FIG. 8 wherein it will be seen that the cured rubber tube 30 is provided with annular corrugations 31. The tube 30 has a uniform wall thickness throughout its length, is relatively flexible and can be stretched or axially elongated to well beyond its natural or collapsed length.

While the invention has been shown and described with respect to a specific embodiment thereof this is intended for the purpose of illustration rather than limitation and other variations and modifications will be apparent to those skilled in the art upon a reading of the specification and claims. Accordingly the patent is not to be limited in any way that is inconsistent with the extent to which the progress in the art has been advanced by the invention.

We claim:

1. In an apparatus for making flexible tubing having annular corrugations, said apparatus including a mandrel adapted to receive an extruded sleeve of uncured rubber thereover and means for radially expanding said sleeve by fluid pressure when received on said mandrel, the improvement which comprises an axially extensible external form adapted to be disposed over said mandrel and sleeve and comprising a plurality of axially spaced unitary disk-like elements, each having an opening defined by a continuous inner edge of the element and coaxial with the respective openings of the other elements, and a plurality of axially extensible helical springs symmetrically spaced about and spaced radially from the axis of the mandrel and extending parallel to the axis of the mandrel and constituting the sole connection between said disk-like elements, each spring being connected to each disk-like element to support said disk-like elements in spaced parallel relation to one another and to accommodate generally uniform increase in the axial spacing between said disk-like elements when said springs are axially extended whereby said disk-like elements cause preliminary annular impressions in the uncured rubber sleeve when said sleeve is radially expanded.

2. Apparatus as defined in claim 1 wherein said openings are circular.

3. Apparatus as defined in claim 1 comprising two of said helical springs.

4. Apparatus as defined in claim 1 wherein at least two convolutions of each of said springs are located between the connections of said spring to adjacent pairs of disk-like elements.

5. Apparatus as defined in claim 1 wherein said springs are attached to the outer edges of said disk-like elements.

* * * * *